United States Patent
Pridmore et al.

(10) Patent No.: US 9,841,714 B2
(45) Date of Patent: Dec. 12, 2017

(54) CREATING SOCIAL PRINTS FROM PHOTOGRAPHS MAINTAINED BY A SOCIAL NETWORKING SYSTEM

(71) Applicant: Facebook, Inc., Menlo Park, CA (US)

(72) Inventors: Keenan Pridmore, Chicago, IL (US); Philip John MacGregor, IV, Chicago, IL (US); Stephen Biddle, Oak Park, IL (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/759,971

(22) Filed: Feb. 5, 2013

(65) Prior Publication Data
US 2014/0218759 A1 Aug. 7, 2014

(51) Int. Cl.
*G06F 3/12* (2006.01)
*G03G 15/00* (2006.01)
*G06Q 50/00* (2012.01)
*G06Q 30/06* (2012.01)

(52) U.S. Cl.
CPC ....... *G03G 15/5075* (2013.01); *G06F 3/1206* (2013.01); *G06F 3/1242* (2013.01); *G06F 3/1268* (2013.01); *G06F 3/1288* (2013.01); *G06Q 30/0601* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 9,081,533 B1* | 7/2015 | West | G06F 3/1272 |
| 2009/0241035 A1* | 9/2009 | Tseng | G06F 17/3089 715/753 |
| 2010/0085610 A1* | 4/2010 | Mimura | 358/448 |
| 2010/0162171 A1* | 6/2010 | Felt | H04M 1/27455 715/835 |
| 2011/0035673 A1* | 2/2011 | Chou | G06F 15/16 715/739 |
| 2012/0226779 A1* | 9/2012 | Crucs | 709/219 |
| 2012/0278387 A1* | 11/2012 | Garcia | G06Q 50/01 709/204 |
| 2012/0300974 A1* | 11/2012 | Rodriguez | H04N 1/32122 382/100 |
| 2013/0003126 A1* | 1/2013 | Van Osdol | G06F 3/1204 358/1.15 |
| 2013/0013683 A1* | 1/2013 | Elliott | G06Q 50/01 709/204 |
| 2013/0218968 A1* | 8/2013 | McEvilly et al. | 709/204 |
| 2013/0321831 A1* | 12/2013 | Srinivasmurthy K | G06F 3/1204 358/1.13 |
| 2013/0329246 A1* | 12/2013 | Parida | 358/1.15 |

* cited by examiner

*Primary Examiner* — Richa Mishra
(74) *Attorney, Agent, or Firm* — Fenwick & West LLP (57) ABSTRACT

A social networking system user may request physical prints of digital photographs stored in connection with the user's user profile on the social networking system. The physical prints are generated by a photograph developer, such as a retail store, and retrieved by the user. The user may request the physical prints from an application executing on a user device that allows the user to identify social context information associated with a digital photograph for inclusion on the physical print. The social networking system may notify users connected to the user and/or to the digital image of the physical print generation.

23 Claims, 7 Drawing Sheets

CREATING SOCIAL PRINTS FROM PHOTOGRAPHS MAINTAINED BY A SOCIAL NETWORKING SYSTEM

BACKGROUND

The present disclosure relates generally to social networking systems, and more particularly to creating prints of users' photographs maintained by a social networking system that include associated social context information from a social networking system.

Social networking systems, or social utilities that track and enable connections between users (including people, businesses, and other entities), have become prevalent in recent years. In particular, a social networking system allows users to more efficiently communicate information that is relevant to their friends or other connections in the social network. Social networks typically incorporate a system for maintaining connections among users in the social network and links to content that are likely to be relevant to the users. Social networks also collect and maintain information about the users of the social network. This information may be static, such as geographic location, employer, job type, age, music preferences, interests, and a variety of other attributes, or it may be dynamic, such as tracking a user's actions within the social network.

Users of a social networking system often store photographs to the social networking system, allowing the photographs to be easily shared with other social networking system users. Users may also associate a social context related to the photographs in the social networking system. For example, a photograph of a father and son may have been captured at a particular football game at a specific geographical location and time. Thus, the social context may include the geographical location and time in which the photograph was captured. Conventional photograph development centers allow users to develop their digital photographs, such as those stored by a social networking system, to create tangible hard copy prints of their digital photographs. However, conventional photo development centers merely generate a print of a photograph itself and are unable to include a description of the social context that is associated with the photograph used to generate the print from a social networking system.

SUMMARY

To enhance user experience, a social networking system allows a social networking system user to identify a digital photograph associated with the user and to request generation of a print of the identified digital photograph that includes social information associated with the photograph by the social networking system. For example, an application executing on a user device allows the user to access the social networking system and identify one or more photographs associated with the user by the social networking system. In one embodiment, the social networking system identifies social context related to one or more digital photographs identified by the user and provides the social context to the user device. Examples of the social context of a photograph include: a date when the digital photograph was initially captured, geographical location information associated with the digital photograph, an event associated with the digital photograph, comments from users of the social networking system related to the digital photograph, a number of users expressing a preference for the digital photograph (i.e., a number of users "liking" the digital photograph), or an identification of users liking the digital photograph, or other suitable information.

From the user device, the user requests creation of a print of a selected digital photograph. The request is communicated to a photograph developer and identifies the digital photograph and includes information describing the social context associated with the digital photograph. For example, the request includes the social context itself or includes information for accessing the social network gin system to retrieve the social context. Using information in the request, the photograph developer generates a print of the selected digital photograph. A print that includes a description of the social context related to the photograph and the digital photograph is identified herein as a "social print." By including the social context information of a photograph in the social print, the user receives a textual narrative providing additional information about the digital photograph that enhances the user's enjoyment of the social print. The user may also order custom products including a copy of a digital photograph and its associated social context from the photograph developer. Examples of custom products include cups, t-shirts, or other items.

In one embodiment, the social networking system also provides notifications to the user's client device indicating events of significance to other users connected to the user via the social networking system (i.e., friends). The notifications may prompt the user to order social prints or custom products from the photograph developer based on the events associated with the additional users connected to the user. A notification may also include recommendations of a digital photograph, or photographs, associated with the events by the social networking system. For example, the social networking system may identify a friend's upcoming wedding anniversary and accordingly recommend to the user a photograph of the user with the friend at the friend's wedding.

In one embodiment, the social networking system may also generate posts that are indicative of the user ordering prints from the photograph developer. Other users that view the posts become aware of the service provided by the photograph developer and may inspire the users to create their own social prints. Furthermore, the social networking system may notify one or more other users that are tagged in photographs included in prints ordered by the user. The notification to the users may provide offers to the users such as a free social print. The offers are meant to inspire the users to create their own social prints.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
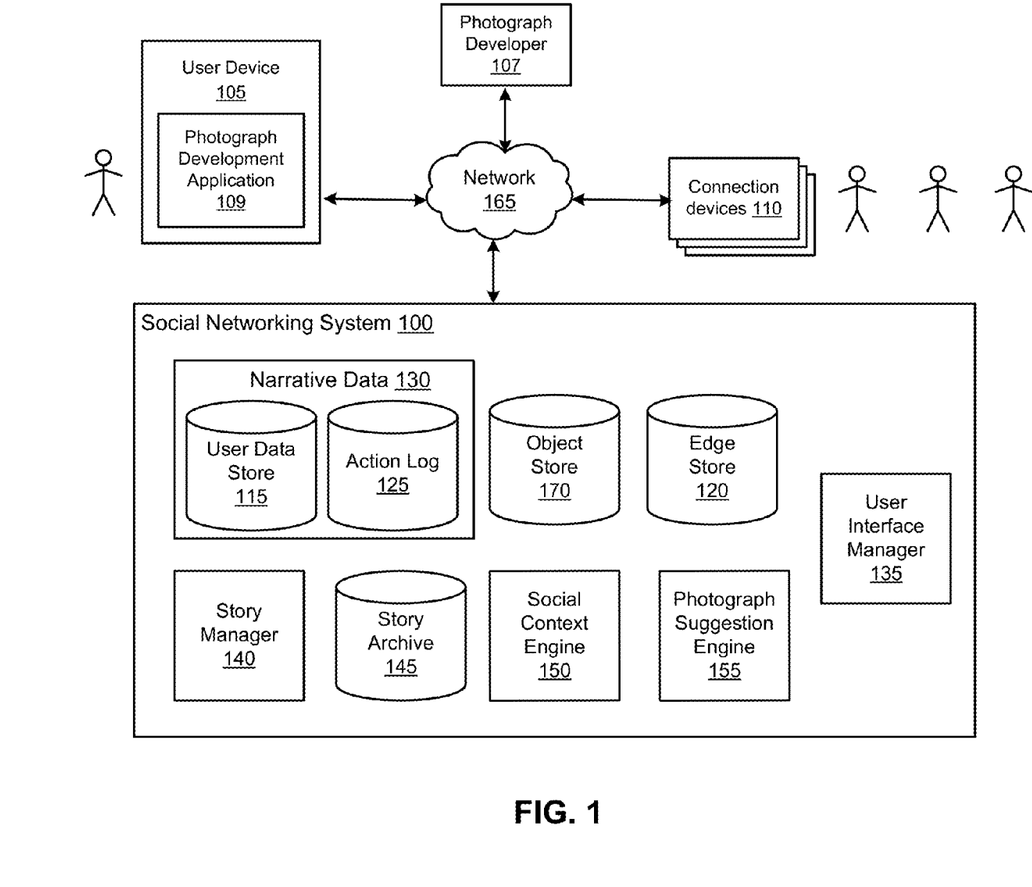
FIG. 1 illustrates a high-level block diagram of a system environment for creating social prints, in accordance with one embodiment.

FIG. 1 illustrates a diagram of a system environment for developing digital photographs ("photographs") maintained by a social networking system 100 into tangible prints include social context information associated with the photographs. In one embodiment, social context information for a digital photograph describes one or more characteristics of the digital photograph that are associated with a user that is related to the digital photograph. Examples of characteristics described by social context information associated with a photograph include: a number of users of a social networking system 100 expressing a preference for the digital photograph (i.e., a number of users "liking" the digital photograph), or an identification of users of the social networking system 100 liking the digital photograph, or other suitable information. Customized captions may also be provided by a user and included on a print of a photograph. A customized caption may provide customized text from the user. As used herein, a print including associated social context and/or customized captions is referred to as a "social print."

Thus, a user may develop a social print at a photograph developer 107, such as a drug store or retailer (e.g., WALGREENS®), based on a digital photograph and associated social context stored by the social networking system 100. In one embodiment, a photograph developer 107 is any commercial entity that develops digital photographs and/or traditional photograph film into prints. Although only a single photograph developer 107 is shown in FIG. 1, any number of photograph developers 107 may communicate with the user device 105 and/or social networking system 100.

Generally, the social networking system 100 offers its users the ability to communicate and interact with other social networking system users. As used herein, a "user" may be an individual or entity (such as a business or a third party application). Also, as used herein, a "connection" identifies a user of the social networking system 100 to which another user may form, or has formed, an association or other relationship. Users join the social networking system 100 and then connect with other users, individuals, and entities to which they desire to be connected. A user may explicitly add a connection. For example, a user selects another user to be a friend of the user. Alternatively, a connection between the user and another user may be automatically created by the social networking system 100 based on common characteristics of the users (e.g., users who are alumni of the same educational institution). Connections in social networking systems may be in both directions or may be in just one direction. For example, if Bob and Joe are both users and connect with each another, Bob and Joe are each connections of the other. If, on the other hand, if Bob wishes to connect to Sam to view Sam's posted content items, but Sam does not choose to connect to Bob, a one-way connection may be formed where Sam is Bob's connection, but Bob is not Sam's connection. Some embodiments of a social networking system 100 allow the connection to be indirect via one or more levels of connections (e.g., friends of friends).

In addition to interactions with other users, the social networking system 100 provides users with the ability to take actions on various types of objects supported by the social networking system 100. These objects may include groups or networks of users to which users of the social networking system may belong, events or calendar entries in which a user might be interested, computer-based applications that a user may use via the social networking system 100, transactions that allow users to buy or sell items via the social networking system 100, and interactions with advertisements that a user may perform on or off the social networking system 100. These are just a few examples of the objects upon which a user may act on a social networking system 100, and many others are possible. Though many of the embodiments and examples provided herein are directed to particular embodiments of a social networking system 100, other embodiments may include other environments involving different types of social networks, social content, and other types of websites and communication mechanisms.

User generated content enhances the user experience on the social networking system 100. Users may provide various content items to the social networking system 100, which stored the content items and associates them with one or more users. Content items are pieces of content that are represented as objects in the social networking system 100. Examples of content items include any type of media content, such as status updates or other textual messages, location information, photographs, images, videos, advertisements, links, or other content. By maintaining content items, the social networking system 100 encourages its users to communicate with each other by "posting" content items of various types of media through various communication channels to the social networking system 100. This increases the frequency with which users of the social networking system 100 engage with each other and with the social networking system 100.

One type of communication channel is a "stream" in which a user is presented with a series of content items that are posted, uploaded, or otherwise provided to the social networking system from one or more users of the service. The stream may be updated as users add content items to the stream. Example communication channels for a social networking system are discussed further in U.S. application Ser. No. 12/253,149, filed Oct. 16, 2008, which is hereby incorporated by reference in its entirety.

Users interact with the social networking system 100 using client devices, which are shown in FIG. 1 as a user device 105 and connection devices 110. The user device 105 and/or connection devices 110 may be any computing device having data processing and data communication capabilities. Examples of client devices include a personal computer (PC), a desktop computer, a laptop computer, a notebook computer, a personal digital assistant (PDA), a mobile telephone, a smartphone, or a tablet computer. These devices may include a camera or other image capture device allowing image and video content to be captured and uploaded to the social networking system 100. A client device also includes an input device for receiving input from a user. Examples of input devices include: a touch screen, a gesture recognition system, a touch pad, a keyboard, a dial pad, or other technology that allows a user to provide input. For example, a user provides input to the social networking system 100 via an input device and a user interface provided by the social networking system 100.

Interactions between the user device 105, connection devices 110 and the social networking system 100 are typically performed via a network 165, for example, via the internet. The network 165 enables communications between the user device 105, connection devices 110, the photograph developer 107, and the social networking system 100. The network 165 includes wireless networks, wired networks, or any suitable combination of wired and wireless networks. In one embodiment, the network 165 uses standard communications technologies and/or protocols. Thus, the network 165 may include links using technologies such as Ethernet, 802.11, worldwide interoperability for microwave access (WiMAX), 3G, 4G, LTE, digital subscriber line (DSL), asynchronous transfer mode (ATM), InfiniBand, PCI Express Advanced Switching, etc.

In one embodiment, the user device 105 executes a user interface or application to allow a user to interact with the social networking system 100. The user interface or application allows the user to perform various actions or activities associated with the social networking system 100 and to view information provided by the social networking system 100. Example actions performed using the user interface include: adding connections, posting messages, posting links, uploading images or videos, updating the user's profile settings, viewing stories, and the like. Examples of information provided by the social networking system 100 that can be viewed using the user interface include: images or videos posted by the user's connections, comments posted by the user's connections, messages sent to the user by other users, wall posts, etc.

For purposes of illustration, when a user "A" views the data of another user "B," user "A" is called the "viewing user," and the user "B" is called the "subject user." The user interface allows a viewing user to view the data of other subject users of the social networking system 100 as well as general data related to news, sports, interests, etc. Information in the user interface may be presented to viewing users in different views. For example, the social data of subject users can be presented to viewing users by way of a "profile page," which is an arrangement of the subject users' social networking data. The information about subject users may also be presented in the form of a news feed including stories describing actions performed by various subject users. In one embodiment the different views are represented using data and code in a web standard format presented through a browser. For example, a news feed may comprise a combination of any of extensible markup language (XML), hypertext markup language (HTML), cascading style sheets (CSS), JAVASCRIPT®, plaintext, and/or JAVA® sent from a server of the social networking system 100 to a web browser running on a client device, such as a user device 105. In another embodiment a news feed may comprise data formatted for presentation through a mobile app or desktop application.

In one embodiment, the user device 105 includes a photograph development application 109. The photograph development application 109 provides users access to digital photographs associated with the users and stored by the social networking system 100 as well as access to social context information associated with the digital photographs by the social networking system 100. The photograph development application 109 allows users to identify a digital photograph and/or social context associated with the digital photograph from the social networking system 100. The photograph development application 109 transmits a request to generate prints of a user's photographs stored by the social networking system 100 from the photograph developer 107 when the user identifies a photograph via the user device 105. Users may also use the photograph development application 109 to request creation of custom products available at the photograph developer 107. In one embodiment, the photograph developer 107 may provide custom products on which a photograph and/or social context information may be printed or otherwise displayed. Examples of custom products include: mugs, cups, t-shirts, calendars, mouse pads, posters, or any item in which a photograph may be printed.

Figure 2:
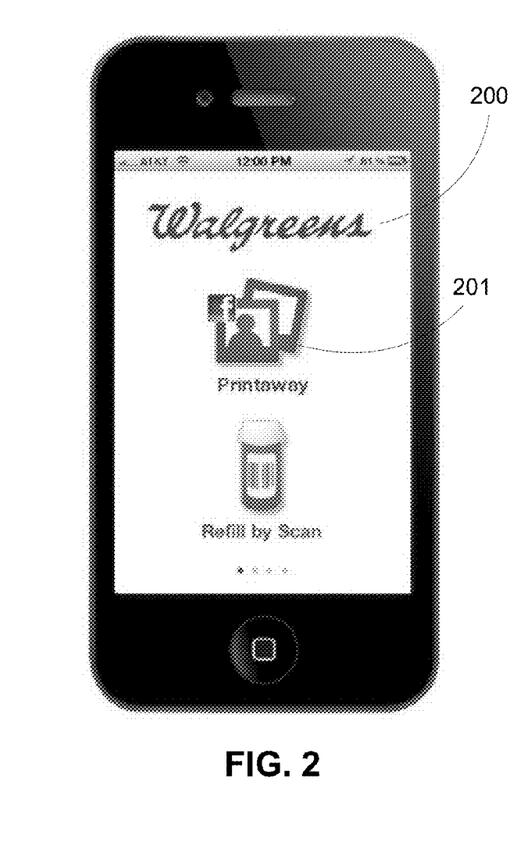
FIG. 2 illustrates a user interface for a photo development application on a user device, in accordance with one embodiment.
Figure 3:
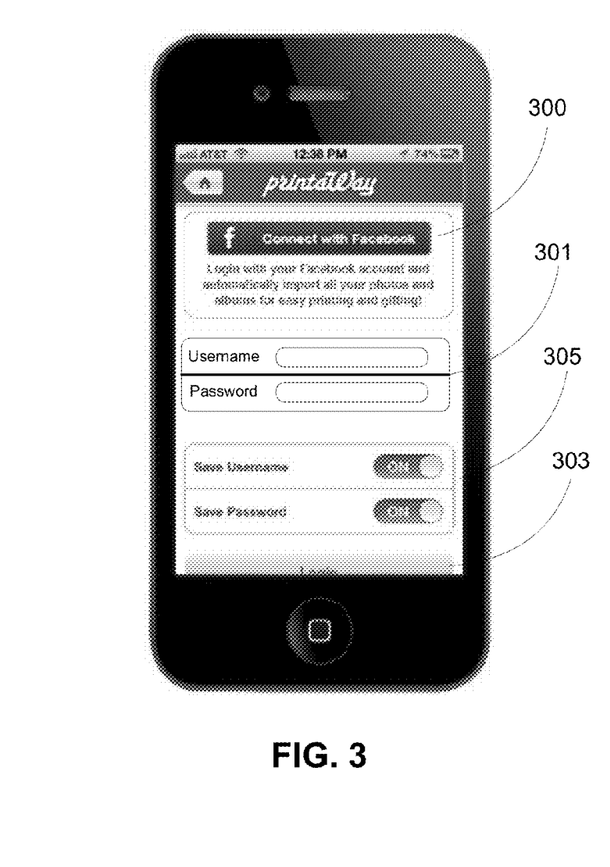
FIG. 3 illustrates a user interface of a login screen for the photo development application, in accordance with one embodiment.

FIGS. 2-8 describe an example of the photograph development application 109. Referring now to FIG. 2, one embodiment of a home page 200 of the photograph development application 109 is shown. The home page 200 includes a login mechanism 201, such as an icon, to access the login page of the photograph development application 109. FIG. 3 illustrates one embodiment of a login page 300 of the photograph development application 109 that may be displayed on the user device 105 when the login mechanism 201 is selected by the user or another suitable interaction is received by the photograph development application 109. The login page 300 prompts the user provide login credentials for accessing the social networking system 100 to access digital photographs and associated social context information, as well as other information, stored by the social networking system 100 and associated with the user. In one embodiment, the login page 300 includes a login area 301 where the user provides a user name and password associated with the user's account on the social networking system 100. In other embodiments, any other suitable login credentials may be provided. The user may submit the login credentials by selecting the login button 303 which causes the user device 105 to transmit the login credentials to the social networking system 100 which then verifies the login credentials. In another embodiment, the photograph development application 109 may retrieve stored login information from a memory of the user device 105 and bypass the login page 300 by communicating the stored login information to the social networking system 100.

In some embodiments, the login page 300 presents login options 305 allowing users to provide input to save the username and/or password in memory of the user device 105. Saving the username and/or password simplifies subsequent use of the photograph development application 109 by retrieving the stored username and/or password (or other login credentials) and communicating the stored information to the social networking system 100 without displaying the login page 300. In one embodiment, the user may be periodically (e.g., once a month) resubmit the login credentials to the social networking system 100 even though the user's credentials are saved. Resubmission of the login credentials prevents fraudulent access to the user's digital photographs and social context information stored by the social networking system 100 to periodically verify that the user of the user device 105 corresponds to the user whose login credentials are saved by the user device 105.

Figure 4:
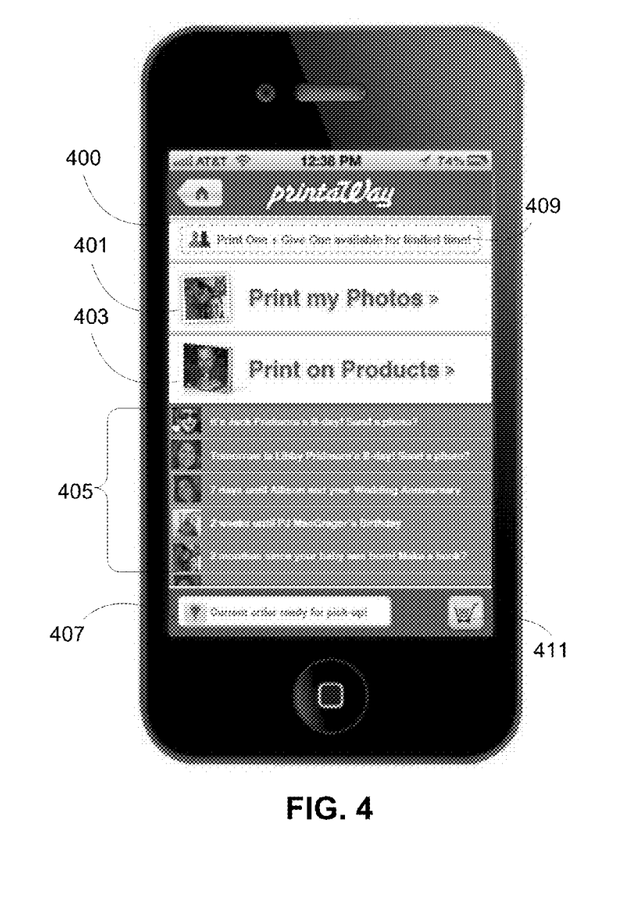
FIG. 4 illustrates a user interface for a main menu of the photo development application, in accordance with one embodiment.

Once logged into the social networking system 100 through the photograph development application 109, an action page 400 is presented to the user. FIG. 4 shows an example action page 400. In the example shown by FIG. 4, the action page 400 displays options for the user to print digital photographs stored by the social networking system 100. For example, the action page 400 presents the user with an option 401 to generate prints of one or more digital photographs stored on the social networking system 100 and a print option 402 to print one or more digital photographs on a custom product by selecting a custom product option 403.

In one embodiment, the action page 400 includes a notification section 405. The notifications section 405 displays notifications provided by the social networking system 100 of activities associated with the user by the social networking system 100 or events/milestones associated with the user by the social networking system 100 that may prompt the user to order social prints from the photograph developer 107 for itself or for other users. For example, the notifications section 405 includes a notification that "It's Jack Pridmore's B-day" to encourage the user to order a print of a photograph associated with Jack Pridmore for sending to Jack Pridmore for his birthday. As another example, the notification section 405 includes a notification that the user's wedding anniversary is in 7 days to entice the user to order a social print including the user and his or her partner.

The action page 400 may also include a status notification 407, which indicates whether the photograph developer 107 has completed a previous order from the user for one or more prints. The status notification 407 may indicate that the user's order is ready for pickup at the photograph developer 107 or may indicate that the order for has been shipped to the user. Alternatively, the status notification 407 may indicate that the order has yet to be completed and may display an estimated time for completion of the order.

In one embodiment, the action page 400 also includes a promotions area 409 identifying current promotions provided by the photograph developer 107, social networking system 100, or any other entity associated with either the photograph developer 107 or the social networking system 100. For example, the promotions area 409 describes a current promotion that if a user orders a print from the photograph developer 107, the user may send the print to another person for free. In one embodiment, the user may interact with the promotions area 409 to claim or accept the presented promotion.

The action page 400 further includes a shopping cart icon 411. Selecting the shopping cart icon 411 presents the user with a list of photographs and/or products that the user plans to order. When a user identifies a photograph to be printed, the photograph and a description of how it is to be printed is stored in a shopping cart, allowing the user to review or modify the selections for printing before they are identified to the photograph developer 107. In one embodiment, when ordering a photograph or product included in the shopping cart, the photograph development application 109 provides a list of photograph developers 107 to which the user may submit the order. The photograph development application 109 may suggest a photograph developer 107 within a threshold distance of the current location of the user device 105 or may display a preferred photograph developer 107 stored as a user preferences of the photograph development application 109. Alternatively, the user may search for a photograph developer 107 and select a photograph developer 107 from search results.

Figure 5:
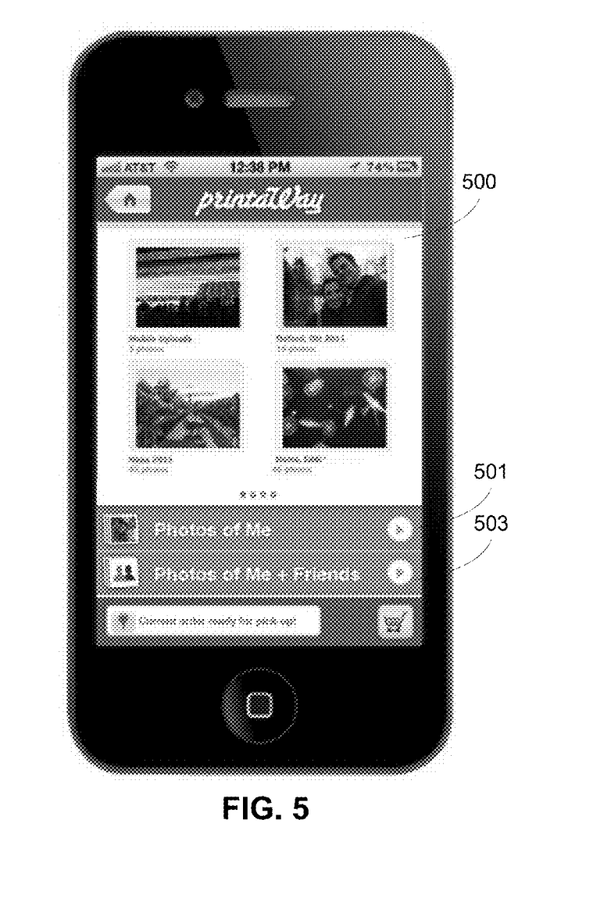
FIG. 5 illustrates photograph albums of the user from the social networking system provided on the photo development application, in accordance with one embodiment.

If the user selects the print option 401 or the custom product option 402 from the action page 400, the photograph development application 109 displays photographs stored by the social networking system 100 that are associated with the user via the user device 105. FIG. 5 illustrates one embodiment of a photograph page 500 displaying photographs stored by the social networking system 100. The photograph page 500 modifies the photographs displayed based on whether the user selects an option 501 to view photographs associated with the user or an option 503 to view photographs associated with user and with one or more additional users by the social networking system 100. If the user selects the option 501 to view photographs of the user, the photograph page 500 displays photographs stored by the social networking system 100 and associated with the user, as shown in FIG. 5. The photographs may be grouped into various albums, which are displayed. The user may specify how the photographs are grouped into albums based on interactions with the social networking system 100. If the user selects the option 503 to display photographs associated with the user and one or more other users, the photograph page 500 displays photographs associated with the user and with one or more additional users. Photographs maintained by the social networking system may be associated with tags identifying the social networking system users included in, or otherwise associated with, the photographs. For example, an additional user connected to the user may upload a photograph and tag the photograph as associated with the user and with the additional user. Thus, when the option 503 to display photographs associated with the user and one or more additional users is selected, the photograph page 500 displays photographs from social networking system 100 associated with the user and with additional users. In some embodiments, the photograph development application 109 may prompt the user to identify one or more additional users so the presented users are associated with at least one of the identified additional users. The user may order any of the presented photographs, whether they were taken by the user or by a user connected to the user, for development by the photograph developer 107.

Figure 6:
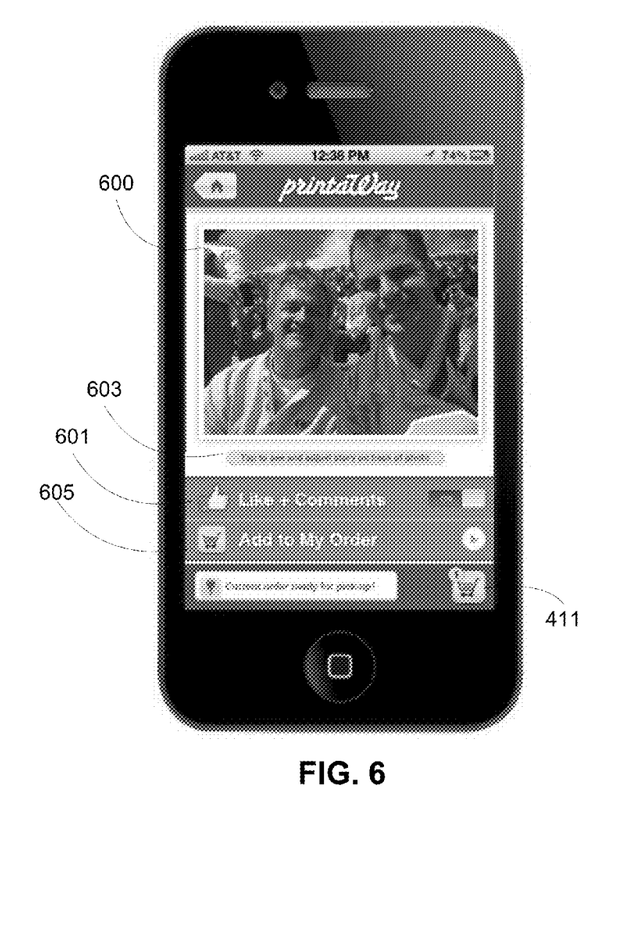
FIG. 6 illustrates a selected photograph for a social print, in accordance with one embodiment.

FIG. 6 illustrates an example of a photograph 600 selected by the user. For example, the photograph 600 is selected by the user via the photograph page 500. The user may order a print of the photograph itself from the photograph developer 107 by selecting the "add to my order" button 605. The shopping cart 411 is accordingly updated to indicate the number of items in the shopping cart and a description of the photograph and options for its printing. In the example of FIG. 6, the shopping cart includes a single item.

In one embodiment, prior to ordering a print of the photograph 600, the user may add a social context and/or custom captions to the selected photograph to create a social print of the photograph. For example, the photograph 600 is presented along with a social context option 601. Selecting the social context option 601 retrieves comments, "likes," or other information associated with the photograph 600 from the social networking system 100. In one embodiment, the user may create and/or modify the social context associated with the photograph 600 by selecting a modification option 603, allowing the user to modify the size of the photograph 600, edit the social context associated with the photograph 600, or otherwise modify the photograph 600 or the social context associated with the photograph 600.

Figure 7:
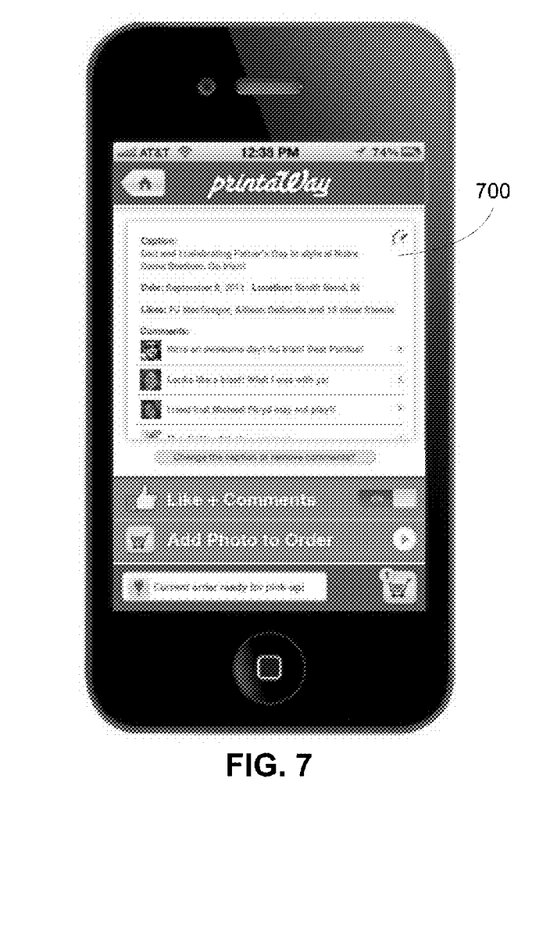

FIG. 7 illustrates an example social context 700 for the photograph 600. The example social context 700 in FIG. 7 includes social information retrieved from the social networking system, such as the date and/or geographic location associated with the photograph, a list of people who liked the photograph in the social networking system 100, users tagged as associated with the photograph, and comments from other users in the social networking system 100 related to the photograph 600. Additionally, the social context 700 may include a custom caption provided by the user, such as text provided by the user to the photograph development application 109. The user may select social context 700 for inclusion on the social print, allowing the user to customize the social context that is printed with the photograph.

Figure 8:
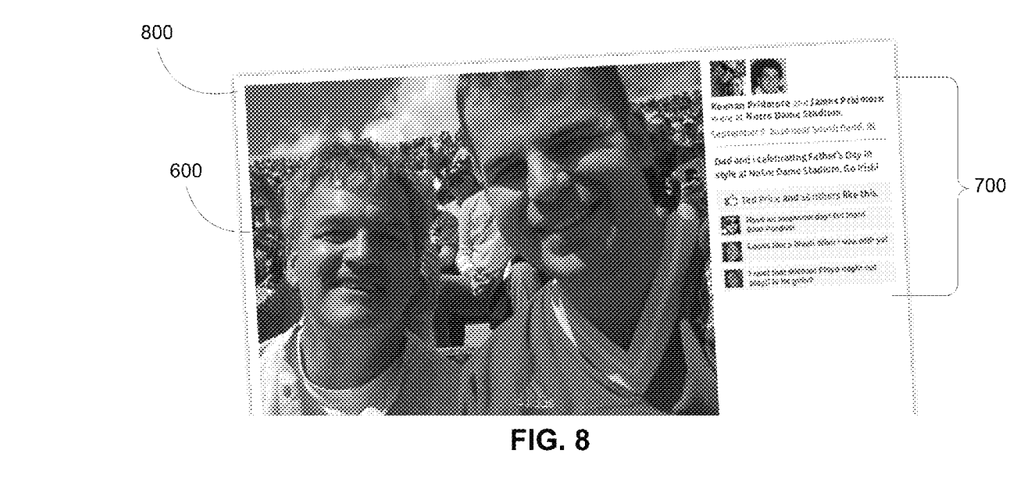
FIG. 8 illustrates a social print, in accordance with one embodiment.

FIG. 8 illustrates one embodiment of a social print 800. The social print 800 includes the photograph 600 shown in FIG. 6 as well as the social context 700 shown in FIG. 7 selected by the user. Although the social context 700 is shown to the right of the photograph 600 in the social print 800, the social context 700 may be located at other positions of the social print 800. For example, the social context 700 may be positioned above, below, or to the left of the photograph 600. Alternatively, the social context may be positioned on the back of the print 800.

After a request for a social print is communicated to a photograph developer 107 via the network 165, the photograph development application 109 may provide incentives to the user in return for ordering the social print. For example, the photograph development application 109 allows the user to send a physical postcard including the social print to another social networking system user free of charge. As another example, the user may earn points for a rewards or loyalty program associated with the photograph developer 107 based on the number of social prints ordered from the photograph developer 107. The points may be redeemed at the photo developer 107 for free social prints, or other products, once a threshold number of points have been accumulated.

Figure 10:
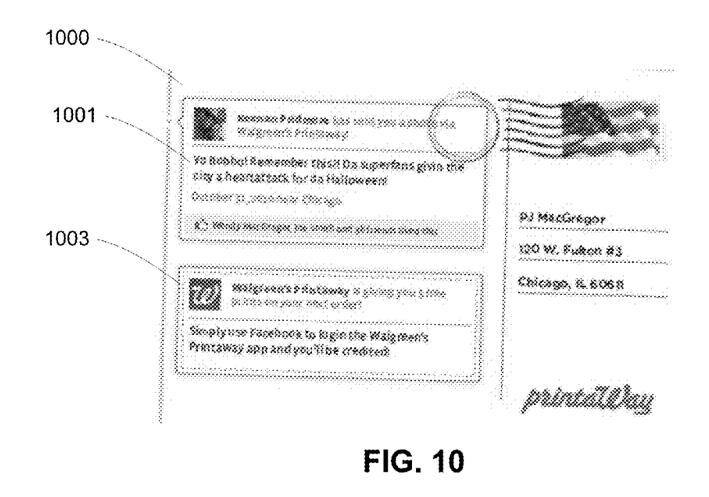
FIG. 10 illustrates a physical post card sent to another user connected to the user in the social networking system regarding a social print, in accordance with one embodiment.

FIG. 10 illustrates one embodiment of a postcard 1000 sent to a social networking system user connected to the user ordering a social print. For example, the postcard 1000 is sent to a user associated with an ordered social print. The postcard 1000 may include a message 1001 from the user that ordered the social print and an indication 1003 of any incentives provided by the photograph developer 107 to encourage the user receiving the postcard 100 to order a social print from the photograph developer 107.

Referring back to FIG. 1, a social network story posted in the social networking system 100 (or "story") is an aggregation of data gathered by the social networking system 100 that is configured for display in various social networking system views (user interface views). For example, stories may be presented to viewing users in a continuously updated real-time newsfeed in a web browser, in a timeline view, or on a user's profile page. A story aggregation is a collection of one or more stories gathered together for display. For example, all the stories related to a particular event, such as a birthday party, may be aggregated into one story aggregation.

When a user joins the social networking system 100 the user creates a user account, which enables the user to maintain a persistent and secure identity on the social networking system 100. The user account may include a user profile that stores details or characteristics about the user. Examples of details or characteristics stored in the user profile include name, age, sex, interests, location, education history, employment information, relationship status etc. The social networking system 100 may provide a user with stream of data to keep the user updated on the activities of the user's connections, as well as to inform the user about news and information related to the user's interests. This stream of data may include stories, which are collections of related data presented together to the user, and story aggregations, which are collections of stories presented to the user.

The social networking system 100 maintains different types of data objects, for example, user data objects, action objects, and edges. A user data store 115 includes user data objects. In one embodiment, a user data object comprises user profile information related to a social networking system user. For example, a user data object stores characteristics of the user such as a user's date of birth, interests, education information, employment information, a photograph of the user, a reference to a photograph of the user or other suitable information about the user.

In one embodiment, an object store 170 stores objects of the social networking system 100. Objects include digital photographs uploaded by users of the social networking system 100 and their associated tags. Tags associated with a digital photograph may describe the user(s) that are included in the photograph, events associated with the photograph, geographical locations associated with the photograph, a date associated with the photograph or any other descriptive information. The digital photographs may be arranged into various photograph albums established by the user that uploaded the digital photographs to the social networking system 100. The object store 170 may also store other objects such as video, audio, word documents, etc.

An edge store 120 stores edges describing relationships and/or associations between users other users, users and objects stored in the object store 170 and/or objects and objects on the social networking system 100. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system 100 ("liking" a page), sharing a link with other users of the social networking system, and commenting on posts made by other users of the social networking system. The edge store 120 stores information about edges, such as affinity scores for objects, interests, and other users as will be further described below.

The action log 125 stores actions performed by users of the social networking system 100 with respect to content items, or objects, stored in the object store 170 or with respect to other users. In one embodiment, an action describes an interaction performed by users with respect to content items. Almost any activity of a user that is directed towards a content item may be stored as an action in the action log 125. For example, an interaction may be the posting of a new comment or status update, dismissing content items such as an advertisement or post, or establishing a connection to another user. In one embodiment, each action is assigned a unique action identifier (ID) and is stored with a user identifier (ID) associated with the user that performed the action. The user data included in the user data store 115 and the actions included in the action log 125 are collectively referred to as narrative data 130.

The social networking system 100 maintains a social graph that tracks the relationship between the various objects, users, and events captured by the social networking system 100. In the social graph the users, the user data and other entities exist as nodes that are connected to each other via edges. In this embodiment, the edges represent actions that create a relationship between the nodes. For example, a node representing a photograph stored in the social networking system 100 may have an edge to a user that uploaded the photograph, and this edge may be an "uploaded by" action. The same photograph may have edges to several other nodes that represent the users in that photograph, and these edges may be "tagged in" actions. Similarly, a node representing a user in the social networking system 100 may have edges to each node representing posts made by that user. These edges may all be "posted by" actions. The edges in the social graph can have different types that correspond to the different types of actions taken by users of the social networking system 100.

The social networking system 100 may maintain or compute a measure of a user's "affinity" for other users (or objects) in the social networking system 100. The measure of affinity may be expressed as an affinity score, which may represent that user's closeness to another user (or object) of the social networking system 100. The affinity score of a user X for another user Y can be used to predict, for example, if user X would be interested in viewing, or would be likely to view, a photo of user Y. The affinity scores can be computed by the social networking system 100 through automated methods, including through predictor functions, machine-learned algorithms, or any other suitable algorithm for determining user affinities. An archive of historical affinity scores for a user may be stored by the social networking system 100 as the user's affinity scores for various users and objects changes over time. Computing user affinities for other users or objects of a social networking system 100 is further disclosed in U.S. application Ser. No. 12/978,265, filed on Dec. 23, 2010, which is hereby incorporated by reference in its entirety.

The social networking system 100 also includes a user interface manager 135. The user interface manager 135 provides server-side functionality allowing social networking system users 100 to interact with the social networking system 100 via a user interface. When users request information from the social networking system 100, the user interface manager 135 dispatches the requested information to users in a format that can be displayed through a client device, such as a user device 105 or a connection device 110. For example, when a user requests a news feed from the social networking system 100, the user interface manager 135 sends stories and story aggregations to a user device 105 and/or connection devices 110 that are configured to be displayed on the devices. Depending on the type of information requested by a user, the user interface manager 135 may send stories, story aggregations, profile pages, timelines, or other data to a client device.

The story manager 140 manages the story generation process. The story manager 140 comprises story generators configured to generate stories for different purposes (i.e., different views), which are stored in the story archive 145. Story generators are configured to generate stories for a particular target view, and may restrict the selection of narrative data used in story generation based on the target view. For example, a story generator may be configured to generate stories for a photo album view, and restrict the narrative data used for story generation to narrative data including or referencing images. Stories generated to be displayed in a user interface of a mobile device may include different data than stories generated to be displayed in a desktop computer interface, and they may be differently visually formatted to optimize for differences between a desktop computer display and a mobile device display (e.g., larger icons for a smaller smartphone screen). The social networking system 100 may also restrict the stories that are provided to a viewing user to stories including data related to the connections of the viewing user (i.e., to stories including data about subject users that are connected to the viewing user in the social networking system 100).

Figure 9:
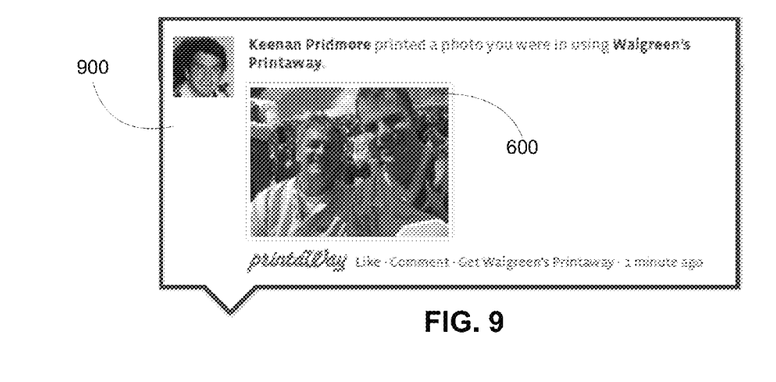
FIG. 9 illustrates a post in a newsfeed in the social networking system regarding the social print, in accordance with one embodiment.

In one embodiment, the story manager 140 generates a newsfeed, which comprises a scrollable list of the most relevant recent stories that may be of interest to a viewing user. The story manager 140 may include a notification in a news feed when a user creates a social print, notifying other users connected to the user of the social print creation. In one embodiment, the story manager 140 may create a notification specifically for an additional user connected to the user creating the social print when the additional user is associated with the photograph used to create the social print. For example, the story manager 140 generates a personalized notification to the additional user that the additional user is included in a social print. FIG. 9 illustrates one example of notification 900 included in a newsfeed of an additional user associated with a generated social print. In the example of FIG. 9, the notification 900 indicates that "Keenan Pridmore printed a photo you were in . . . " and also includes the photograph 600 used to generate the social print. The additional user may then perform various actions based on the notification 900 such as liking the photograph, commenting on the photograph, or obtaining the photograph development application 107 to allow the additional user to also order social prints.

Figure 11:
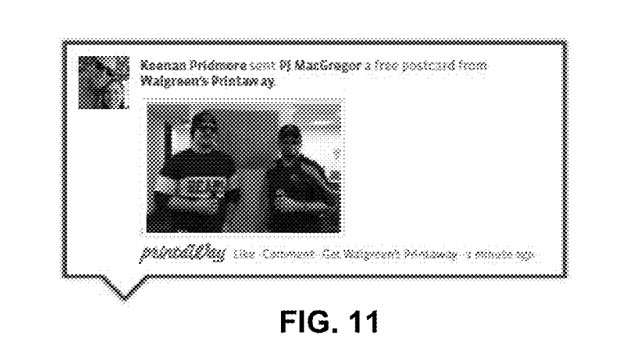
FIG. 11 illustrates a post in a newsfeed in the social networking system regarding the post card, in accordance with one embodiment.

In one embodiment, the story manager 140 may also generate a notification included in news feeds to additional users connected to a user when the user sends a post card of a social print to another user. FIG. 11 illustrates one example of a notification included in a user's newsfeed indicating that a postcard of a social print was sent to an additional social networking system user. As shown in FIG. 11, the notification may include the photograph used to generate the social print used to generate the postcard.

In one embodiment, the story manager 140 determines a viewing user's interest for stories when identifying stories for inclusion in a news feed for the viewing user. For example, the story manager 140 may determine the viewing user's affinity for stories and use the affinities to select stories for the newsfeed, although any other suitable method for determining interest in stories may be used. In one embodiment, the story manager 140 generates a timeline, which is a chronological list of stories related to a particular subject user that are ordered by time period. In some embodiments, a timeline may alter the ranking of some stories depending on other factors such as social importance or likely engagement value. Stories that are configured for display in a timeline are called timeline units. A timeline may also include special "report" units, which include multiple timeline units that have been aggregated together. For example, a user may have several wall posts from friends during the month of November. That user's timeline may then include a report unit containing all posts from friends during that month. For newsfeeds and timelines there may be multiple story generators producing stories of different types that are displayed together. Systems and methods for generating stories from data captured by a social networking system 100 are disclosed in U.S. application Ser. No. 11/503,037, filed on Aug. 11, 2006, and U.S. application Ser. No. 11/502,757, filed on Aug. 11, 2006, which are hereby incorporated by reference in their entirety. Timelines and timeline units are discussed in more detail in utility application U.S. application Ser. No. 13/239,347, filed on Sep. 21, 2011, which is also hereby incorporated by reference in its entirety.

In one embodiment, the social networking system 100 comprises a social context engine 150 that identifies the social context associated with a photograph selected by the user for generating a social print. The photograph may be selected by a user via a photograph development application 109 executing on a user device 105, as described above. When a user selects a photograph to generate a social print, the social context engine 150 retrieves social context from the object store 170, the action log 135 and/or the edge store 120 associated with the selected photograph. As described above, the social context associated with the photograph may be included in a social print generated from the selected photograph.

In one embodiment, the social networking system 100 includes a photograph suggestion engine 155 that identifies events or actions for notification to a user. For example, the photograph suggestion engine 155 identifies events associated with additional users connected to a user via a photograph development application 109 to notify the user of events or actions associated with the additional users that may motivate the user to order a social print. In one embodiment, the photograph suggestion engine 155 analyzes timelines and/or user profiles of additional users connected to a user in the social networking system 155. From each timeline and/or user profile, the photograph suggestion engine 155 may identify any upcoming events of significance to an additional user connected to the user within a threshold amount of time (e.g., days) from the current date. For example, the photograph suggestion engine 155 may identify anniversaries of any events (e.g., wedding anniversary or birthdays) in timelines of users connected to the user that are within a month from the current date. In one embodiment, the photograph suggestion engine 155 may also analyze posts made by additional users connected to the user in the social networking system 100 to identify any upcoming events involving an additional user connected to the user. In other embodiments, the photograph suggestion engine 155 may identify events associated with actions performed by an additional user within a threshold time of a current date, may identify events based on historical events associated with an additional user by the social networking system 100, or using any other suitable criteria.

In one embodiment, the photograph suggestion engine 155 creates one or more notifications for identified events that are presented on a user device 105 via the photograph development application 109. The notifications remind the user of the events to entice the user to order a social print related to the events. For example, as shown in FIG. 4, the notifications area 405 includes a notification indicating that it is "7 days until Allison and your Wedding Anniversary" and "It's Jack Pridmore's B-day!" The user may then select a photograph associated with a user identified in a notification to generate a social print as a gift to an identified user.

In one embodiment, the photograph suggestion engine 155 may also suggest photographs associated with identified events for the user to use to generate a social print. The photograph suggestion engine 155 may search the photographs of a user associated with an identified event or may search the photographs associated with the user for photographs associated with an identified event. For example, the photograph suggestion engine 155 may identify photographs in the social networking system 100 including tags identifying a name of the additional user connected to the user, the name of the user, the event, an event name, and/or the date of the event. For example, the photograph suggestion engine 155 may identify a wedding anniversary of a user and his wife by searching photographs associated with the user and photographs associated with the user's wife for photographs having tags specifying "wedding," the date of the wedding, and/or tags that indicate both the user and the user's wife are in the photograph.

Providing Content to a User

Figure 12:
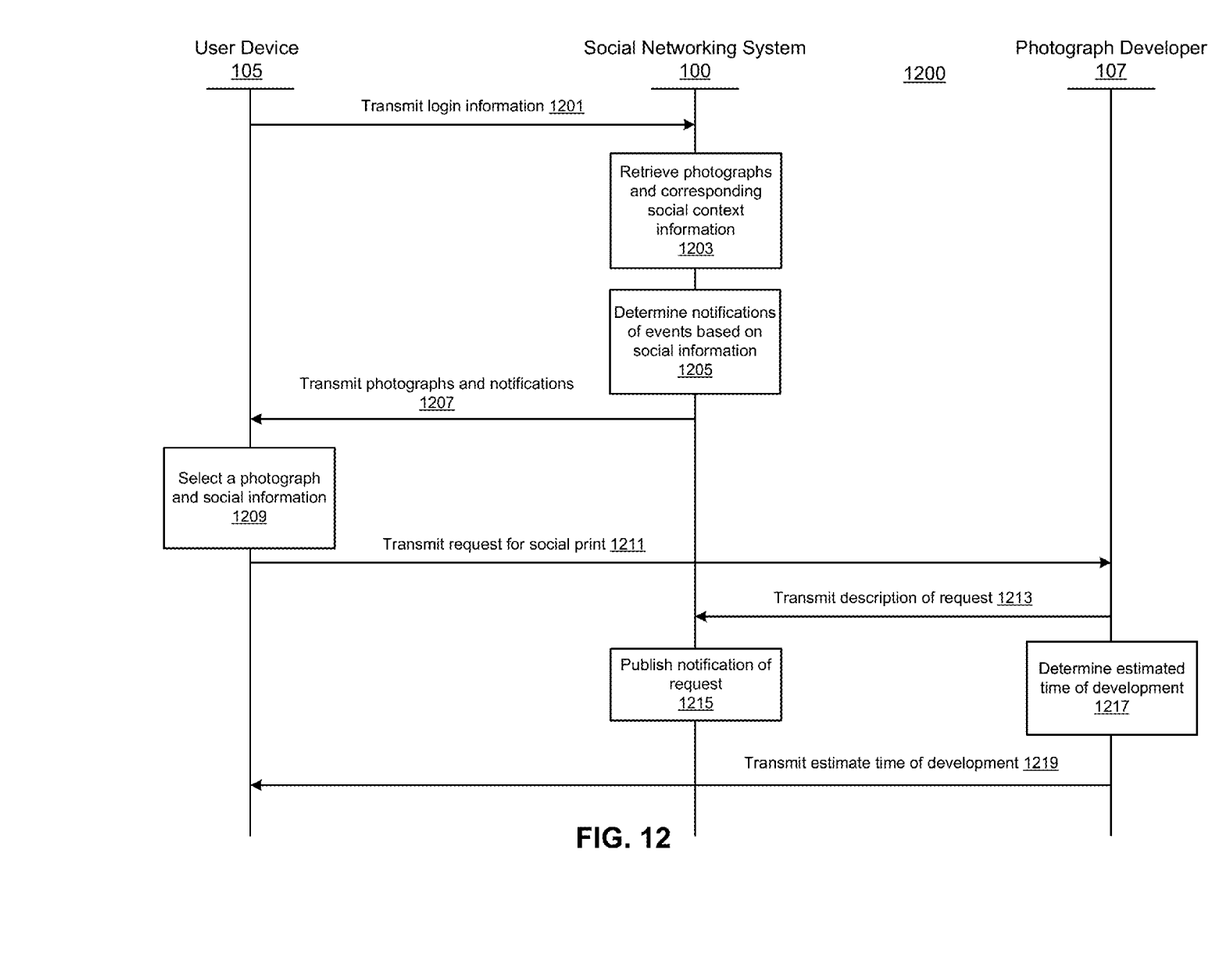
FIG. 12 illustrates an interaction diagram describing a process to develop a social print, in accordance with one embodiment.

FIG. 12 illustrates an interaction diagram describing one embodiment of a process 1200 for generating a social print from a photograph stored by a social networking system 100. In other embodiments, different and/or additional steps than those shown in FIG. 12 may be performed.

The user device 105 transmits login information 1201 to the social networking system 100, allowing access to data associated with the user of the user device 105, such as photographs associated with the user and stored by the social networking system 100. The login information may include a username and password or any other suitable login credentials. After verifying the login information, the social networking system 100 retrieves 1203 photographs and social context information 1203 associated with the retrieved photographs 1203. The photographs may be photographs uploaded to the social networking system 100 by the user or photographs uploaded by other users connected to the user and that are associated with the user of the user device 105.

In one embodiment, the social networking system 100 also accesses user profiles or other data associated with users connected to the user of the user device 105 to identify events associated with the users connected to the user of the user device 105. Based on the accessed information, the social networking system 100 identifies events associated with additional users having a specified type, events associated with additional users having a date within a threshold time from the current date, or identifies events associated with additional users having any suitable criteria. Based on the identified events, the social networking system 100 determines 1205 notifications of events to suggest to the user of the user device 105. For example, the social networking system 100 generates notifications of events associated with additional users and within a threshold time of the current time for communication to the user of the user device 105. The notifications may be presented to the user via a photograph development application 109, as described above.

The social networking system transmits 1207 the retrieved photographs to the user device 105 via the network 165. In an embodiment, notifications are also transmitted 1207 to the user device 105 via the network 165. Using the user device 105, such as through a photograph development application 109, the user of the user device 105 selects 1209 a photograph and may also select 1209 social context information associated with the photograph for generating a social print. In one embodiment, the user of the user device 105 provides a caption or other text and/or image data for including on the social print. The request identifies the selected photograph, the user of the user device 105 and/or social context information, and a caption, if provided, associated with the selected photograph. The request also identifies the photograph developer 107 to generate the social print, which may be selected as described above. The user device 105 transmits 1211 the request to the photograph developer 107 via the network 165. Alternatively, the user device 105 transmits the request to the social networking system 100, which transmits 1211 the request to the photograph developer 107. In one embodiment, the request also includes payment information provided by the user. Examples of payment information include: a billing address, shipping address if applicable, credit card information, or other suitable account identifying information.

The photograph developer 107 then transmits 1213 a description of the request to the social networking system 100. In one embodiment, the description identifies the photograph selected by the user for the social print, the social context information included in the social print, a caption associated with the social print and/or a digital copy of the social print for inclusion in newsfeeds. The social networking system 100 publishes 1215 a notification of the order for the social print to additional users of the social networking system 100 connected to the user of the user device 105. As described above, the social networking system 100 may publish 1215 the notification as a story in newsfeeds of additional users connected to the user of the user device 105 indicating the request for the social print from the photograph developer 107. The social networking system 100 may also publish 1215 a story describing the request in the newsfeed of an additional user associated with the photograph used to generate the social print. Any other suitable method of notification may be used, such as transmitting a notification message, an e-mail, a text message or any other suitable channel may be used to publish 1215 the request for a social print to social networking system users.

In one embodiment, the photograph developer 107 determines 1217 an estimated time of development of the social print. The time of development may be based on the number of social prints currently queued for development by the photograph developer 107 and/or the number of social prints included in the request. The photograph developer 107 transmits 1219 the estimated time of development to the user device 105.

SUMMARY

The foregoing description of the embodiments herein has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

The embodiments described herein may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments herein is intended to be illustrative, but not limiting, of the scope of the invention, which is set forth in the following claims.

What is claimed is:

1. A computer-implemented method comprising:
   storing, at a social networking system, a user profile for a user of the social networking system, the user connected to other users of the social networking system;
   persistently storing, at the social networking system, social context information of digital photographs associated with the user;
   receiving a request to generate one or more prints of a digital photograph associated with the user, and to include social context information describing one or more characteristics of the digital photograph that are associated with the user;
   retrieving, by the social networking system, the social context information that is associated with the digital photograph and persistently stored at the social networking system, the social context information naming both another user connected to the user in the social networking system that is shown in the digital photograph and another user connected to the user in the social networking system that commented on the digital photograph in the social networking system; and
   transmitting the digital photograph and the social context information to a photograph developer, the photograph developer generating a physical print including the digital photograph and the social context information printed on the physical print, the printed social context information naming on the physical print both the other user connected to the user in the social networking system that is shown in the digital photograph and the other user connected to the user in the social networking system that commented on the digital photograph in the social networking system.

2. The computer-implemented method of claim 1, wherein the one or more characteristics of the digital photograph described by the social context information is further selected from a group consisting of: a geographical location at which the digital photograph was taken, an event associated with the digital photograph, an indicated interest in the digital photograph by a user of the social networking system connected to the user, and any combination thereof.

3. The computer-implemented method of claim 1, further comprising:
presenting a notification to one or more of the other users of the social networking system connected to the user indicating receipt of a request to generate the one or more prints from the user.

4. The computer-implemented method of claim 3, wherein the notification is presented to a user of the social networking system that is associated with the digital photograph.

5. A computer-implemented method comprising:
storing, at a social networking system, a user profile for a user of the social networking system, the user connected to other users of the social networking system;
storing, at the social networking system, social context information of digital photographs associated with the user;
selecting, by the social networking system, one or more candidate digital photographs associated with the user and stored by the social networking system;
presenting the selected candidate digital photographs to the user via a user device;
receiving, at the social networking system, a request from the user device to generate a physical print including a selected candidate digital photograph and social context associated with the selected candidate digital photograph;
retrieving, by the social networking system, the social context information associated with the selected candidate digital photograph and stored at the social networking system, the social context information naming both another user connected to the user in the social networking system that is shown in the selected candidate digital photograph and another user connected to the user in the social networking system that commented on the selected candidate digital photograph in the social networking system; and
transmitting the selected candidate digital photograph and the social context information to a photograph developer, the photograph developer generating the physical print including the digital photograph and the social context information printed on the physical print, the printed social context information naming on the physical print both the other user connected to the user in the social networking system shown in the selected candidate digital photograph and the other user connected to the user in the social networking system that commented on the selected candidate digital photograph in the social networking system.

6. The computer-implemented method of claim 5, wherein the social context information associated with the selected candidate digital photograph is further selected from a group consisting of: a geographical location at which the selected candidate digital photograph was taken, an event associated with the selected candidate digital photograph, comments on the selected candidate digital photograph from the other user of the social networking system connected to the user that commented on the selected candidate digital photograph, an indicated interest in the selected candidate digital photograph by a user of the social networking system connected to the user, and any combination thereof.

7. The computer-implemented method of claim 5, wherein selecting one or more candidate digital photographs associated with the user and stored by the social networking system comprises:
selecting digital photographs stored by the social networking system having a tag identifying the user.

8. The computer-implemented method of claim 5, wherein selecting one or more candidate digital photographs associated with the user and stored by the social networking system comprises:
selecting digital photographs stored by the social networking system identifying the user and at least one additional user connected to the user are included in the digital photographs.

9. The computer-implemented method of claim 5, further comprising
accessing user profiles associated with one or more of the other users connected to the user;
determining one or more events associated with at least one of the other users connected to the user; and
notifying the user of a determined event and of another user associated with the determined event and connected to the user.

10. The computer-implemented method of claim 9, wherein determining one or more events associated with at least one of the other users connected to the user comprises:
determining one or more events associated with one or more of the other users that are associated with a date within a threshold time from a current date.

11. The computer-implemented method of claim 9, wherein determining one or more events associated with at least one of the other users connected to the user comprises:
determining actions performed by one or more of the other users within a threshold time from a current date; and
identifying one or more events associated with at least one of the determined actions.

12. The computer-implemented method of claim 9, wherein determining one or more events associated with at least one of the other users connected to the user comprises:
retrieving historical events associated with one or more of the other users connected to the user stored by the social networking system; and
identifying one or more events based on the retrieved historical events.

13. The computer-implemented method of claim 9, further comprising:
retrieving one or more digital photographs from the social networking system associated with the determined event; and
transmitting a recommendation to generate a physical print including one of the retrieved digital photographs associated with the determined event to the user device.

14. The computer-implemented method of claim 5, further comprising:
providing an incentive to generate an additional physical print to an additional user associated with the selected candidate digital photograph via the social networking system.

15. A computer-implemented method comprising:
transmitting, from a client device, a request to a social networking system for candidate digital photographs associated with a user of the client device, the candidate digital photographs persistently stored at the social networking system;
receiving, at the client device, the candidate digital photographs associated with the user and social context information associated with the candidate digital photographs from the social networking system, the social context information persistently stored at the social networking system;

displaying the received candidate digital photographs via the client device;

receiving, via the client device, a selection of a digital photograph from the received candidate photographs;

displaying, via the client device, social context information associated with the selected digital photograph, the social context information naming another user connected to the user in the social networking system that commented on the selected digital photograph in the social networking system;

receiving, via the client device, a request to generate a print of the selected digital photograph that includes the social context information associated with the selected digital photograph;

transmitting, via the client device, the request to a photograph developer, the photograph developer generating a physical print based on the selected digital photograph and including the social context information associated with the selected digital photograph, the social context information printed on the physical print and naming on the physical print the other user connected to the user in the social networking system that commented on the selected digital photograph in the social networking system.

16. The computer-implemented method of claim 15, wherein the social context information associated with selected digital photograph is further selected from a group consisting of: a geographical location at which the selected candidate digital photograph was taken, an event associated with the selected digital photograph, comments on the selected candidate digital photograph from the other user of the selected digital photograph connected to the user that commented on the selected digital photograph, an indicated interest in the selected digital photograph by a user of the social networking system connected to the user, and any combination thereof.

17. The computer-implemented method of claim 15, wherein transmitting the request for candidate digital photographs associated with the user of a client device from the social networking system comprises:

transmitting a request for digital photographs stored by the social networking system identified as including the user.

18. The computer-implemented method of claim 15, wherein transmitting the request to the social networking system for candidate digital photographs associated with the user comprises:

transmitting a request for digital photographs stored by the social networking system identified as including the user and at least one additional user connected to the user in the social networking system.

19. The computer-implemented method of claim 15, further comprising:

displaying a notification of one or more events associated with one or more additional users connected to the user via the social networking system having a date within a threshold date of a current date.

20. The computer-implemented method of claim 19, wherein the notification identifies one or more photographs associated with an event associated with one or more of the additional users connected to the user via the social networking system.

21. The computer-implemented method of claim 19, further comprising:

receiving a status of generation of the physical print from the photograph developer; and displaying the status on the client device.

22. A computer-implemented method comprising:

receiving a request to generate a physical print from a social networking system, the request identifying a digital photograph associated with a user of the social networking system and social context information associated with the digital photograph, and wherein the social networking system retrieved the digital photograph and the social context information associated with the digital photograph from a persistent storage at the social networking system to generate the request, the social context information naming both another user connected to the user in the social networking system that commented on the digital photograph in the social networking system and another user connected to the user in the social networking system that is shown in the digital photograph;

generating a physical print based on the digital photograph and including a representation of the social context information printed on the physical print, the representation of the social context information naming on the physical print both the other user connected to the user in the social networking system that commented on the digital photograph in the social networking system and the other user connected to the user in the social networking system that is shown in the digital photograph; and notifying the user of the social networking system of the physical print.

23. The computer-implemented method of claim 1, wherein the printed social context information naming the other user includes a name that represents the other user in the social networking system.

* * * * *

UNITED STATES PATENT AND TRADEMARK OFFICE
CERTIFICATE OF CORRECTION

PATENT NO. : 9,841,714 B2
APPLICATION NO. : 13/759971
DATED : December 12, 2017
INVENTOR(S) : Keenan Christopher Pridmore et al.

Page 1 of 1

It is certified that error appears in the above-identified patent and that said Letters Patent is hereby corrected as shown below:

In the Claims

Column 17, Line 9, after "receipt of" delete "a" and insert -- the --.

Signed and Sealed this
Fifth Day of June, 2018

Andrei Iancu
*Director of the United States Patent and Trademark Office*